(12) United States Patent
Han et al.

(10) Patent No.: US 11,900,722 B2
(45) Date of Patent: Feb. 13, 2024

(54) ELECTRONIC APPARATUS AND CONTROL METHOD THEREOF

(71) Applicant: SAMSUNG ELECTRONICS CO., LTD., Suwon-si (KR)

(72) Inventors: Heungwoo Han, Suwon-si (KR); Seongmin Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 494 days.

(21) Appl. No.: 17/087,005

(22) Filed: Nov. 2, 2020

(65) Prior Publication Data

US 2021/0150192 A1    May 20, 2021

(30) Foreign Application Priority Data

Nov. 19, 2019 (KR) ........................ 10-2019-0148991

(51) Int. Cl.
*G06V 40/16* (2022.01)
*G06N 20/00* (2019.01)
(Continued)

(52) U.S. Cl.
CPC ........... *G06V 40/161* (2022.01); *G06N 20/00* (2019.01); *G06V 10/255* (2022.01);
(Continued)

(58) Field of Classification Search
None
See application file for complete search history.

(56) References Cited

U.S. PATENT DOCUMENTS

| 9,418,283 B1 | 8/2016 | Natarajan et al. |
| 10,304,193 B1 | 5/2019 | Wang et al. |

(Continued)

FOREIGN PATENT DOCUMENTS

| CN | 110674696 A | * | 1/2020 |
| CN | 111353331 A | * | 6/2020 |

(Continued)

OTHER PUBLICATIONS

Written Opinion (PCT/ISA/237) issued by the International Searching Authority in International Application No. PCT/KR2020/015350, dated Feb. 15, 2021.

(Continued)

*Primary Examiner* — Fan Zhang
(74) *Attorney, Agent, or Firm* — Sughrue Mion, PLLC

(57) ABSTRACT

An electronic apparatus may include a processor configured to: obtain an image captured by a camera; obtain a downscaled image by downscaling the captured image, wherein the downscaled image has an image that is less than a critical resolution, identify a region of interest included in the downscaled image by inputting the downscaled image into a first artificial intelligence model, the first artificial intelligence model being trained to identify a region of interest in an image; extract, from the captured image, an object image in the captured image corresponding to the identified region of interest, and obtain information on an object region included in the captured image by inputting the extracted object image into a second artificial intelligence model, the second artificial intelligence model being configured to identify an object region in an input image.

19 Claims, 13 Drawing Sheets

(51) Int. Cl.
*G06V 40/20* (2022.01)
*G06V 10/82* (2022.01)
*G06V 10/44* (2022.01)
*G06V 10/20* (2022.01)

(52) U.S. Cl.
CPC ............ *G06V 10/454* (2022.01); *G06V 10/82* (2022.01); *G06V 40/168* (2022.01); *G06V 40/176* (2022.01); *G06V 40/23* (2022.01)

(56) References Cited

U.S. PATENT DOCUMENTS

| | | | |
|---|---|---|---|
| 10,504,027 B1* | 12/2019 | Kim | G06N 3/045 |
| 11,048,266 B2 | 6/2021 | Jeon | |
| 2018/0181797 A1* | 6/2018 | Han | G06V 10/764 |
| 2019/0026544 A1* | 1/2019 | Hua | A61B 5/1128 |
| 2019/0034734 A1 | 1/2019 | Yen et al. | |
| 2019/0072977 A1 | 3/2019 | Jeon | |
| 2019/0156157 A1 | 5/2019 | Saito et al. | |
| 2019/0197331 A1 | 6/2019 | Kwak et al. | |
| 2019/0228275 A1 | 7/2019 | Smilansky et al. | |
| 2019/0258878 A1 | 8/2019 | Koivisto et al. | |
| 2019/0279046 A1 | 9/2019 | Han et al. | |
| 2019/0340462 A1* | 11/2019 | Pao | G06V 10/82 |
| 2019/0347501 A1 | 11/2019 | Kim et al. | |
| 2021/0042928 A1* | 2/2021 | Takeda | G06N 3/084 |
| 2021/0278858 A1 | 9/2021 | Jeon | |

FOREIGN PATENT DOCUMENTS

| | | |
|---|---|---|
| KR | 10-0316784 B1 | 3/2002 |
| KR | 10-0883632 B1 | 2/2009 |
| KR | 10-1920281 B1 | 11/2018 |
| KR | 10-1921868 B1 | 11/2018 |
| KR | 10-2019-0026116 A | 3/2019 |

OTHER PUBLICATIONS

International Search Report (PCT/ISA/210) issued by the International Searching Authority in International Application No. PCT/KR2020/015350, dated Feb. 15, 2021.

* cited by examiner

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0148991, filed on Nov. 19, 2019, in the Korean Intellectual Property Office, the disclosure of which is incorporated by reference herein in its entirety.

BACKGROUND

1. Field

The disclosure relates to an electronic apparatus and a method for controlling an electronic apparatus. In particular, the disclosure relates to an electronic apparatus including a camera and a method for controlling the electronic apparatus to perform object recognition/detection in images captured by the camera.

2. Description of Related Art

Development of electronic technology has resulted in development and distribution of various types of electronic devices.

In particular, various types of electronic apparatuses that process high-resolution content and images to provide or display information have been developed, but the development of technology for processing the same, which is required, has lagged behind. For example, there is an increasing need for a method capable of processing a number of calculations required to process a high-resolution content (e.g., an image captured by a camera) with limited resources.

With a related-art image processing apparatus, the amount of calculations required for processing a high-resolution image has been limited and a lot of time is required. Accordingly, there is a need in the related art to generate and provide a high-resolution image while only processing a relatively small amount of calculations by an electronic device (e.g., an image processing device).

SUMMARY

Provided is an electronic apparatus inputting a region of interest and an image corresponding thereto to an artificial intelligence model and a method for controlling thereof.

An electronic apparatus according to an embodiment includes a camera, a memory configured to store a first artificial intelligence model trained to identify a region of interest in an input image and a second artificial intelligence model trained to identify an object region in an input image, and a processor connected to the camera and the memory, the processor being configured to control the electronic apparatus, and the processor is further configured to downscale an image obtained by the camera to an image less than a critical resolution, obtain information on a region of interest included in the downscaled image by inputting the downscaled image to the first artificial intelligence model, obtain an image corresponding to the region of interest from an image obtained by the camera based on the information on the region of interest, and obtain the information on an object region included in the obtained image by inputting the obtained image to the second artificial intelligence model.

A method for controlling an electronic apparatus storing a first artificial intelligence model trained to identify a region of interest in an input image and a second artificial intelligence model trained to identify an object region in an input image includes downscaling an image obtained by the camera to an image less than a critical resolution, obtaining information on a region of interest included in the downscaled image by inputting the downscaled image to the first artificial intelligence model, obtaining an image corresponding to the region of interest from an image obtained by the camera based on the information on the region of interest, and obtaining the information on an object region included in the obtained image by inputting the obtained image to the second artificial intelligence model.

According to various embodiments, a calculation is performed for a region of interest and thus, processing a high-resolution image is available by efficiently using a limited resource.

According to various embodiments, an artificial intelligence model may perform inputting or calculating only for a region of interest excluding an unnecessary region, without inputting the entire high-resolution image to an artificial intelligence model or performing a calculation for entire high-resolution image.

According to various embodiments, feature information of an object may be obtained and provided by inputting an image according to a region of interest to various artificial intelligence models.

According to an embodiment, an electronic apparatus comprising: a processor configured to: obtain an image captured by a camera; obtain a downscaled image by downscaling the captured image, wherein the downscaled image is an image that is less than a critical resolution; identify a region of interest included in the downscaled image by inputting the downscaled image into a first artificial intelligence model, the first artificial intelligence model being trained to identify a region of interest in an input image; extract, from the captured image, an object image in the captured image corresponding to the identified region of interest; and obtain information on an object region included in the captured image by inputting the extracted object image into a second artificial intelligence model, the second artificial intelligence model being configured to identify an object region in an input image.

The electronic apparatus may further comprise: a memory that stores the first artificial intelligence model and the second artificial intelligence model.

The first artificial intelligence model may be a model trained using a sample image less than the critical resolution. The second artificial intelligence model may be a model trained using a sample image greater than or equal to the critical resolution.

The processor may be further configured to: resize the object image to be a critical size, and obtain the information on the object region by inputting the resized object image of the critical size to the second artificial intelligence model.

The memory may further store a third artificial intelligence model trained to obtain feature information of an object based on an object region included in an input image, and the processor may be further configured to: obtain an image corresponding to the object region in an image corresponding to the region of interest or an image obtained by the camera based on the information on the object region, and obtain the feature information included in the obtained image by inputting the obtained image to the third artificial intelligence model.

The third artificial intelligence model comprises a plurality of artificial intelligence models trained to obtain different feature information of the object, the processor is further configured to obtain second feature information of the object by inputting first feature information obtained from a first model of the plurality of artificial intelligence models to a second model of the plurality of artificial intelligence models, the first model being different from the second model, and the plurality of artificial intelligence models are each trained to obtain other feature information of the object based on an image corresponding to an object region and one feature information of the object.

The information on the object may be information about a user area adjacent to the electronic apparatus in the captured image. The processor may be further configured to obtain feature information of a user by inputting an image corresponding to the user area to the third artificial intelligence model, and the feature information of the user comprises at least one of facial recognition information, gender information, body shape information, or emotion recognition information of the user.

The memory further stores a fourth artificial intelligence model trained to identify an object in an input image, and the processor is further configured to: based on probability information of the region of interest included in the information about the region of interest being less than a critical value, input the image corresponding to the region of interest to the fourth artificial intelligence model, identify whether the object is included in the image corresponding to the region of interest based on an output of the fourth artificial intelligence model, and based on the object being included in the image corresponding to the region of interest, input the image corresponding to the region of interest to the second artificial intelligence model.

The processor may be further configured to, based on a size of the region of interest being identified to be greater than or equal to a critical value based on the information on the region of interest, obtain the image corresponding to the region of interest in the downscaled image, and input the obtained image to the second artificial intelligence model.

The region of interest may comprise at least one of: a region including an object, a region where a motion occurs, a color change region, or an illuminance change region.

The electronic apparatus may be a mobile robot, and the processor may be further configured to control the mobile robot to move.

The processor may be further configured to: detect an intruder or a fire generation region based on the object image, and based on detecting the intruder or the fire generation region, perform a corrective action, wherein the corrective action includes at least one of: outputting an alarm audibly via a speaker or visually via a display, controlling a display to display the object image and/or the region of interest corresponding to the object image, or transmitting information regarding the object image to a user terminal.

The electronic apparatus may further comprise the camera.

The processor may be further configured to: detect an intruder or a fire generation region based on the object image, and based on detecting the intruder or the fire generation region, perform a corrective action, wherein the corrective action includes at least one of: outputting an alarm audibly via a speaker or visually via a display, controlling a display to display the object image and/or the region of interest corresponding to the object image, or transmitting information regarding the object image to a user terminal.

According to an embodiment, a method may comprise: obtaining an image captured by a camera; obtaining a downscaled image by downscaling the captured image, wherein the downscaled image is an image that is less than a critical resolution; identifying a region of interest included in the downscaled image by inputting the downscaled image into a first artificial intelligence model, the first artificial intelligence model being trained to identify a region of interest in an input image; extracting, from the captured image, an object image in the captured image corresponding to the identified region of interest; and obtaining information on an object region included in the captured image by inputting the extracted object image into a second artificial intelligence model, the second artificial intelligence model being configured to identify an object region in an input image.

According to an embodiment, a non-transitory medium may comprise computer-executable instructions, which when executed by a processor, cause the processor to perform a method comprising: obtaining an image captured by a camera; obtaining a downscaled image by downscaling the captured image, wherein the downscaled image is an image that is less than a critical resolution; identifying a region of interest included in the downscaled image by inputting the downscaled image into a first artificial intelligence model, the first artificial intelligence model being trained to identify a region of interest in an input image; extracting, from the captured image, an object image in the captured image corresponding to the identified region of interest; and obtaining information on an object region included in the captured image by inputting the extracted object image into a second artificial intelligence model, the second artificial intelligence model being configured to identify an object region in an input image.

According to an embodiment, a computer-implemented method of training at least two neural networks for object detection comprising: collecting a set of digital sample images from a database; inputting the collected set of digital sample images into a first neural network recognition model; training the first neural network recognition model to recognize regions of interest in the digital sample images; extracting, from the digital sample images, object images in the digital sample images corresponding to the recognized regions of interest; inputting the extracted object images into a second neural network recognition model, the second neural network recognition model being different from the first neural network recognition model; and training the second neural network recognition model to recognize information regarding objects in the object images.

According to an embodiment, the digital sample images may be images that are captured by a camera.

The digital sample images may have a resolution that is greater than a resolution of the extracted object images.

The computer-implemented method may further comprise: downsizing the digital sample images prior to inputting the collected set of digital sample images into the first neural network recognition model.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
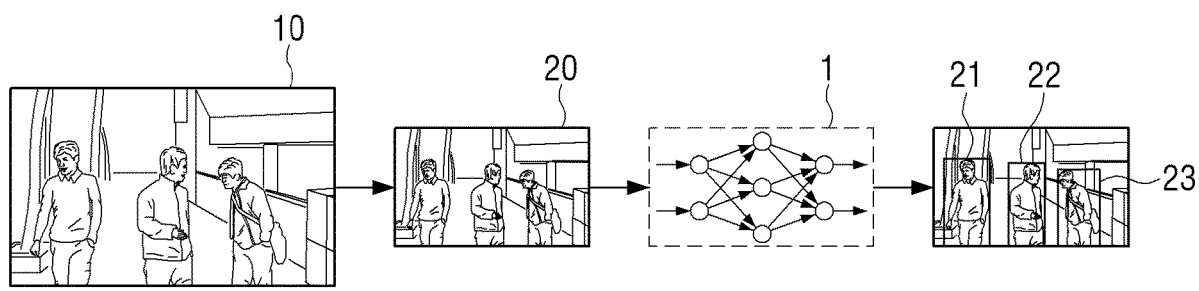
FIG. 1 shows a diagram illustrating a region of interest according to an embodiment.

Before describing the disclosure in detail, an overview for understanding the present disclosure and drawings will be provided.

The terms used in the present disclosure and the claims may be general terms identified in consideration of the functions of the various example embodiments of the disclosure. However, these terms may vary depending on intention, legal or technical interpretation, emergence of new technologies, and the like of those skilled in the related art. Also, some terms arbitrarily selected by an applicant may be used and in this case, the meaning thereof will be described in the corresponding description. Therefore, the terms used herein should be defined based on the overall contents and the meaning of the terms, instead of simple names of the terms.

Embodiments of the disclosure may apply various transformations and may have various embodiments, which are illustrated in the drawings and are described in detail in the detailed description. It is to be understood, however, that the intention is not to limit the scope of the particular embodiments, but on the contrary, the intention is to cover all modifications, equivalents, and alternatives falling within the spirit and scope of the disclosure. In the following description, a detailed description of the related art will be omitted when it is determined that the subject matter of the related art can obscure the subject matter.

The terms such as "first," "second," and so on may be used to describe a variety of elements, but the elements should not be limited by these terms. The terms are used for the purpose of distinguishing one element from another.

A singular expression may include a plural expression, unless otherwise specified. It is to be understood that the terms such as "comprise" or "consist of" may, for example, be used to designate a presence of a characteristic, a number, a step, an operation, an element, a component, or a combination thereof, and does not preclude a presence or a possibility of adding one or more of other characteristics, numbers, steps, operations, elements, components or a combination thereof.

The term such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Hereinafter, embodiments of the disclosure will be described in detail with reference to the accompanying drawings so that those skilled in the art may easily practice the embodiment. This disclosure may, however, be embodied in many different forms and should not be construed as limited to the embodiments set forth herein. In the drawings, to clarify the disclosure, the parts irrelevant with the description are omitted, and like reference numerals refer to like parts throughout the specification.

FIG. 1 shows a diagram illustrating a region of interest in an image according to an embodiment.

An electronic apparatus according to an embodiment may be implemented as various devices such as a user terminal device, a display device, a set-top box, a tablet personal computer (PC), a smartphone, an e-book reader, a desktop PC, a laptop PC, a workstation, a server, a personal digital assistant (PDA), a portable multimedia player (PMP), an MP3 player, a kiosk, or the like. However, this is an embodiment, and the electronic apparatus 100 may be implemented with various types of electronic apparatuses, including wearable devices corresponding to at least one type of accessory type (e.g., a watch, a ring, a bracelet, an ankle bracelet, a necklace, glasses, contact lenses, or a head-mounted-device (HMD)), fabric, or clothing-integrated (e.g., electronic clothing), a robot including a driver, a projector, a server, and/or the like.

The electronic apparatus according to an embodiment may be implemented as a robot. The robot may denote a machine of various types having an ability to perform a function. For example, the robot may denote a smart machine that detects a surrounding environment on a real-time basis using a sensor, or a camera, or the like, collects information, and automatically operates, in addition to performing a simple iterative function.

The robot may include a driver that includes an actuator or a motor. According to an embodiment, the robot can control the movement of a robot's (articulated) joint by using a driver. The driver may include a wheel, a brake, or the like, and the robot may be implemented as a mobile robot that is movable by itself within a specific space using a driver. The robot joint can refer to one component of the robot to replace functions of a human arm or hand.

The robot can be classified into at least one of: industrial, medical, home-use, military-use or exploration-use, or the like, depending on a field or a function that can be performed. According to an embodiment, an industrial robot may be divided into a robot used in a manufacturing process of a product of a factory, a robot performing a guest service, order reception, serving, or the like, at a store or restaurant, or the like. However, this is merely exemplary, and the robot may be variously classified according to an application field, a function, and a purpose of use, and is not limited to the above-described example.

For convenience, the electronic apparatus may be assumed to be the robot.

The electronic apparatus according to an embodiment may downscale an input image 10 to obtain an image 20 with a lower resolution than the input image 10. In an embodiment, the electronic apparatus may apply sub-sampling to the input image 10 to downscale the resolution of the input image 10 to a target resolution. According to an embodiment, the target resolution may denote low resolution less than a critical resolution.

For example, if the input image 10 is a 4K-resolution ultra-high definition (UHD) image, a line buffer memory which is larger than when applying a secure digital (SD) image (having, for example, a resolution of 720×480) by a minimum of 5.33 times (3840/720) is required to obtain information corresponding to the input image 10 by inputting the input image 10 to the first and second artificial intelligence models. In addition, there are problems in that a memory storage space for storing intermediate calculation results of each of the hidden layers included in the first and second artificial intelligence models, the amount of calculation required to obtain information corresponding to the input image 10, and the required performance of a graphics processing unit (GPU) and/or a central processing unit (CPU) may increase in an exponential manner.

The electronic apparatus according to an embodiment may downscale the input image 10 to reduce the calculation amount, a storage space of a memory, or the like, required in the first and second artificial intelligence models, and may apply the downscaled image 20 to the first artificial intelligence model.

Referring to FIG. 1, the electronic apparatus according to an embodiment may input the downscaled image 20 to a first artificial intelligence model 1 to obtain information on the region of interest included in the downscaled image 20.

According to an embodiment, the first artificial intelligence model 1 may be a model trained to identify a region of interest in the input image. According to an embodiment, the first artificial intelligence model 1 may be a model trained to identify a region of interest (ROI) which is estimated to include an object in the input image or a candidate area based on a plurality of sample data. However, this is merely exemplary without limitation. For example, the first artificial intelligence model 1 may identify at least one of a region that is assumed to include an object in an input image, a region in which a motion has occurred, a color change region, or an illuminance change region, as the region of interest. According to an embodiment, the first artificial intelligence model 1 may compare a preceding input image with a subsequent input image in a time order to identify a region in which the pixel value has changed, and identify whether an object is included in the region.

The object may refer to a human adjacent to an electronic apparatus, a user, or the like. For example, the first artificial intelligence model 1 may identify a region which is estimated to include an object that the user is interested in according to a setting in the input image.

Referring to FIG. 1, the electronic apparatus may input the downscaled image 20 into the first artificial intelligence model 1, and the first artificial intelligence model 1 may output information about the region of interest included in the downscaled image. According to an embodiment, the first artificial intelligence model 1 may identify a region that is estimated as an image corresponding to a person in the downscaled image and may output information about the region. The information about the region of interest may include location information of the region of interest, size information of the region of interest, size information of an object included in the region of interest, or the like.

The electronic apparatus according to an embodiment may input the downscaled image 20 to the first artificial intelligence model 1 to obtain information for each of a plurality of regions of interest 21, 22, 23. In one example, the information for the first region of interest 21 may be information about a region that includes the first user included in the downscaled image 20. For example, the information about the region including the first user may include the location of the region including a first user in the downscaled image 20 and the size of the region, or the like.

Referring to FIG. 1, the electronic apparatus 100 may obtain information on each of a plurality of regions of interests 21, 22, 23 by inputting the downscaled image 20 to the first artificial intelligence model 1, but the number of region of interest is not limited and may be different according to the input image.

Referring to FIG. 1, the first artificial intelligence model 1 identifies a region including a user in an input image as a region of interest, but the embodiment is not limited thereto. For example, the first artificial intelligence model 1 may identify the region of interest in the input image where a motion occurs as the region of interest, and may identify the region of interest where a specific color appears in the input image as the region of interest. As an example, the electronic apparatus may be a closed-circuit television (CCTV), the CCTV may obtain the downscaled image 20 from the image 10, and may identify a region where a motion occurs (such as an intrusion region of an intruder), a region in which a particular color appears (such as a fire generation region) as the region of interest, based on the downscaled image 20. According to an embodiment, the electronic apparatus may detect the intruder or the fire generation region, and perform a corrective action, such as, outputting an alarm (e.g., audibly via a speaker, or visually via a display), and/or controlling a display to display the image and/or the region of interest corresponding to, for example, the intruder or the fire generation region.

The electronic apparatus according to an embodiment may obtain an image corresponding to the region of interest in the input image 10 based on the information on the region of interest. The electronic apparatus may obtain information on the object region by inputting an image corresponding to the region of interest to the second artificial intelligence model. A specific description will refer to FIG. 2.

Figure 2:
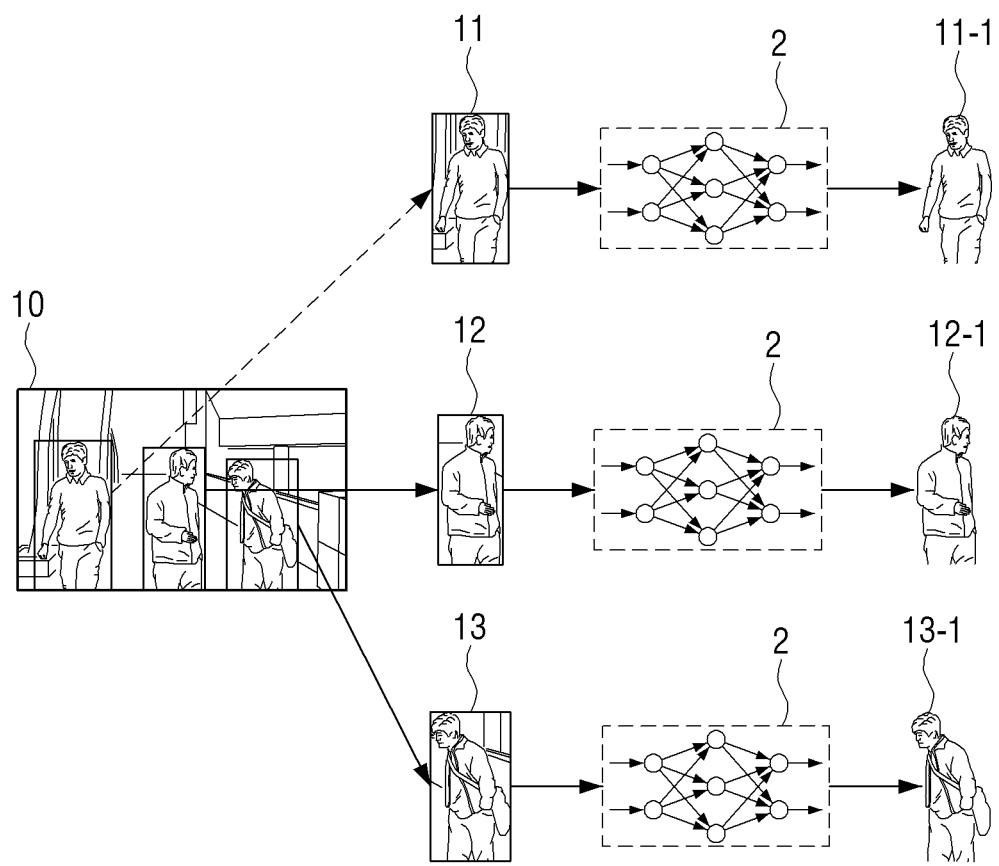
FIG. 2 shows a diagram illustrating an object region according to an embodiment.

FIG. 2 shows a diagram illustrating an object region according to an embodiment.

Referring to FIG. 2, the electronic apparatus may obtain an image corresponding to the region of interest in the input image 10 based on the information on the region of interest obtained from the first artificial intelligence model 1.

For example, the electronic apparatus may obtain information about the first region of interest 21 that includes an image corresponding to the first user from the first artificial intelligence model 1. The electronic apparatus may then obtain an image 11 corresponding to the first region of interest from the input image 10 based on information about the first region of interest 21. According to an embodiment, the electronic apparatus may obtain the image 11 corresponding to the first region of interest from the input image 10, which is the high resolution image, rather than the downscaled image 20 based on the location or size of the first region of interest included in the information about the first region of interest 21.

According to an embodiment, the electronic apparatus may input the image 11 corresponding to the first region of interest to the second artificial intelligence model 2 to obtain the information 11-1 on the first object region. Referring to FIG. 2, the information 11-1 on the first object region is illustrated as an image from which background and other objects included in the image 11 corresponding to the first region of interest are removed, but this is for convenience. The information 11-1 on the first object region which is obtained by the electronic apparatus inputting the image 11 corresponding to the first region of interest to the second artificial intelligence model 2 may include information on the size of the first object and information on each of a plurality of sub-regions consisting the first object.

For example, based on the first object being the first user, the information 11-1 on the first object region may include location information on each of a plurality of sub-regions (e.g., face region, upper body region, lower body region, or the like) comprising a type of a first user, size information, or the like. This will be further described with reference to FIG. 6.

As another example, based on the input image 10 being a traffic photo or a road photo, the first object may be a vehicle, a road sign, or the like. In this example, the electronic apparatus may downscale the input image 10 and then identify the region that is estimated as the vehicle or road sign in the downscaled image 20 as the region of interest. The electronic apparatus may then obtain an image corresponding to the region of interest from the input image 10 based on information about the region of interest, e.g., location information of the region of interest. The image corresponding to the region of interest may be at least one of a vehicle image or a road sign image.

As another example, based on the input image 10 being an indoor photo, the first object may be furniture, a home appliance, a wall, or the like disposed indoors. In this example, the electronic apparatus may downscale the input image 10 and then identify the region which is estimated as the furniture, the home appliance, or the wall as the region of interest based on the downscaled image 20. The electronic apparatus may obtain location information and size information for the region of interest. The electronic apparatus may then obtain a furniture image, a home appliance image, or a wall image from the high resolution input image 10 based on the location information and size information of the region of interest. The electronic apparatus may then obtain feature information of each object based on the obtained image or the like. The feature information of each object may denote the size, color, model name, etc. of the furniture corresponding to the obtained image and may denote the size, color, model name, etc. of the household appliance.

As a still another embodiment, the electronic apparatus may control a function of the electronic apparatus based on the obtained image. According to an embodiment, the electronic apparatus may be a mobile robot moving in a specific space, and a moving path of the electronic apparatus (robot) may be controlled based on the size and location of the object (e.g., the size and location of the furniture, the size and location of the home appliance, or the like).

Figure 3:
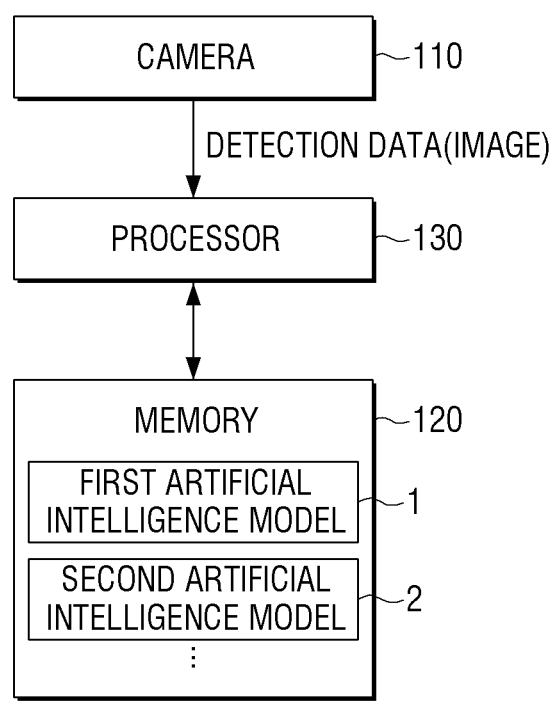
FIG. 3 shows a block diagram illustrating a configuration of an electronic apparatus according to an embodiment.

FIG. 3 shows a block diagram illustrating a configuration of an electronic apparatus according to an embodiment.

Referring to FIG. 3, the electronic apparatus 100 may include a camera 110, a memory 120, and a processor 130, according to an embodiment.

The camera 110 may be configured to obtain one or more images located at a periphery of the electronic apparatus 100. The camera 110 may be implemented as a red-green-blue (RGB) camera, a three-dimensional (3D) camera, or the like.

According to an embodiment, the camera 110 may obtain an image greater than or equal to a threshold resolution by capturing a peripheral region of the electronic apparatus 100, and then transmit an obtained image to the processor 130.

The memory 120 may be configured to flexibly store various information related to a function of the electronic apparatus 100. The memory 120 may be implemented as a non-volatile memory such as a flash memory (e.g., NOR (neither/nor) or NAND (not and) flash memory, or the like), solid state drive (SSD), hard disk, or the like.

In the memory 120, one or more artificial intelligence models may be stored. Specifically, the memory 120 according to the disclosure may be stored with a first artificial intelligence model that is trained to identify the region of interest in the input image. The memory 120 may be stored with a second artificial intelligence model that is trained to identify the object region in the input image. The first artificial intelligence model 1 may be a model trained using a sample image below a critical resolution, and the second artificial intelligence model 2 may be a model trained using a sample image greater than or equal to a critical resolution. For example, if the processor 130 downscales the image 10 with a target resolution, the first artificial intelligence model 1 may be a model trained using a plurality of sample images of the same resolution as the target resolution. The second artificial intelligence model 2 may be a model trained using a plurality of sample images of the same resolution as the resolution of the images acquired through the camera 110.

The artificial intelligence (AI) model according to an embodiment may be a trained determination model based on an artificial intelligence algorithm on a basis of a plurality of images, and may be based on a neural network. The trained determination model may include a plurality of weighted network nodes that may be designed to simulate the human brain structure on a computer and simulate a neuron of a human neural network. The plurality of network nodes may each establish a connection relationship so that the neurons simulate the synaptic activity of the neurons sending and receiving signals through the synapse. Also, the trained determination model may include, for example, a machine learning model, a neural network model or a deep learning model developed from a neural network model. In the deep learning model, a plurality of network nodes are located at different depths (or layers), and may transmit and receive data according to a convolution connection relationship.

As an example, the artificial intelligence model may be a trained convolution neural network (CNN) model based on an image. The CNN may be a multi-layer neural network having a special connection structure designed for one or more of: voice processing, image processing, or the like. However, the artificial intelligence model is not limited to CNN. For example, the artificial intelligence model may be implemented as a deep neural network (DNN) model of at least one of a recurrent neural network (RNN), a long short term memory network (LSTM), gated recurrent units (GRU), or generative adversarial networks (GAN).

The processor 130 may control general or overall operations of the electronic apparatus 100.

According to one embodiment, the processor 130 may be implemented as a digital signal processor (DSP), a microprocessor, or a Time Controller (T-CON), but is not limited thereto. The processor 130 may include one or more of a hardware processor, a central processing unit (CPU), a GPU, a microcontroller unit (MCU), a micro processing unit (MPU), a controller, an application processor (AP), a communication processor (CP), or an Advanced RISC Machine (ARM) processor. The processor 130 may be implemented as a system on chip (SoC), a large scale integration (LSI) with a processing algorithm embedded therein, or as field programmable gate array (FPGA).

The processor 130 according to an embodiment may include feature information of an object included in the image 10 obtained through the camera 110.

According to an embodiment, based on the resolution of the image 10 captured via the camera 110 is high resolution (e.g., having a resolution above a resolution threshold), the processor 130 may downscale the image 10 below a critical resolution to reduce the amount of computations that must be performed to obtain the feature information of the object included in the image 10, and identify the region of interest estimated to include the object based on the downscaled image 20.

The processor 130 may then obtain an image corresponding to the region of interest in the image 10 obtained by the camera 110 based on information about the region of interest. According to one embodiment, the processor 130 may obtain information about the region of interest in the downscaled image 20 and perform calculations on only one region corresponding to the region of interest rather than the entirety of the high-resolution input image 10 to obtain information about the object and feature information of the object.

The processor 130 according to an embodiment may obtain an image corresponding to the region of interest in the image 10 obtained by the camera 110 based on information on the region of interest, and may enter the obtained image into the second artificial intelligence model 2. According to an embodiment, the processor 130 may resize an image corresponding to the region of interest to an image of a critical size.

FIG. 4 shows a diagram illustrating an input image of an artificial intelligence model according to an embodiment.

Figure 4A:
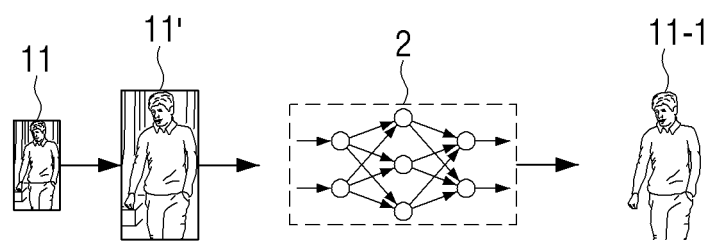
FIGS. 4A-4C each show a diagram illustrating an input image of an artificial intelligence model according to an embodiment.

Referring to FIG. 4A, the processor 130 may obtain an image 11 corresponding to the first region of interest based on information about the first region of interest 21. In this case, based on the image 11 corresponding to the first region of interest being less than the threshold size, the processor 130 may resize the image 11 corresponding to the first region of interest to obtain a resized critical size image 11'. The processor 130 may then enter the resized critical size image 11' into the second artificial intelligence model 2. The processor 130 may then obtain the information 11-1 for the first object region included in the image 11 corresponding to the first region of interest.

Figure 4B:
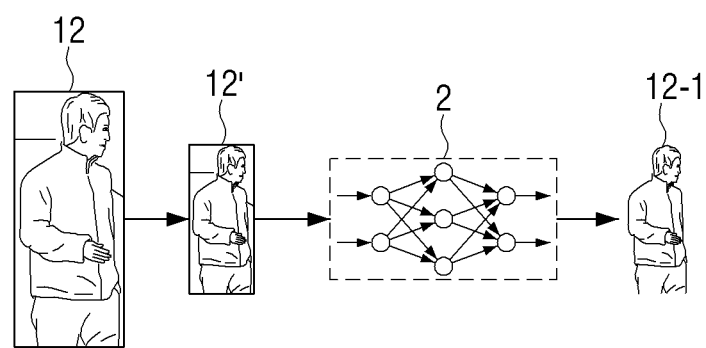

As another example, as shown in FIG. 4B, the processor 130 may obtain the image 12 corresponding to the second region of interest based on information about the second region of interest 22. In this case, if the image 12 corresponding to the second region of interest exceeds the threshold size, the processor 130 may resize the image 12 corresponding to the second region of interest to obtain the resized critical size image 12'. The processor 130 may then enter the resized critical size image 12' into the second artificial intelligence model 2. The processor 130 may then obtain information 11-2 for a second object region included in the image 12 corresponding to the second region of interest.

Figure 4C:
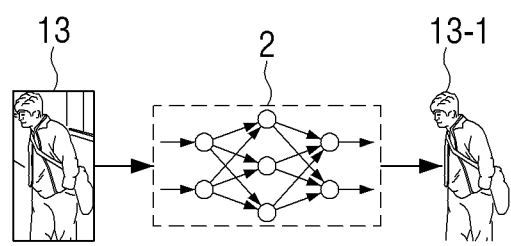

As a still another example, as shown in FIG. 4C, the processor 130, based on an image 13 corresponding to a third region of interest corresponding to a critical size (e.g., at or above a critical size threshold), may input the image 13 corresponding to the third region of interest to the second artificial intelligence model 2 without a separate resizing. The processor 130 may obtain the information 11-3 on the third object region included in the image 13 corresponding to the third region of interest.

Referring back to FIG. 3, the memory 120 according to one embodiment may further include a third artificial intelligence model. The third artificial intelligence model may be a model trained to obtain feature information of an object included in each of a plurality of sample images using a plurality of sample images. According to an embodiment, the feature information may include all types of information that may specify an object. For example, if the object is a user, the object's feature information may include the user's features, that is, face recognition information, gender information, age group information, body type information (height, weight, etc.) or pitch range of the user's voice, or the like. Here, the feature information may be referred to as identification information or the like, but may be referred to as feature information. As another example, if the object is furniture, a home appliance, or the like, the object's feature information may include one or more of color information, size information, shape information, location information in a specific space, or the like, of furniture and home appliance.

Figure 5:
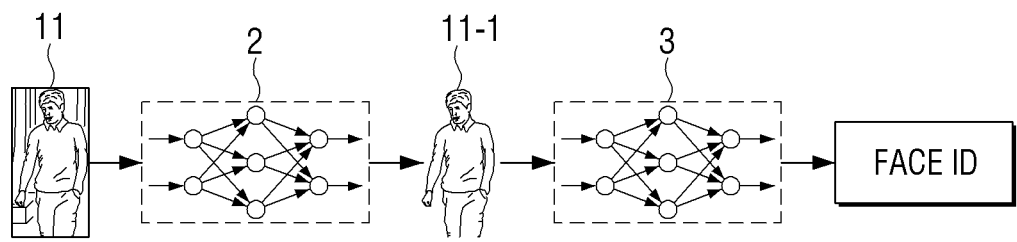
FIG. 5 shows a diagram illustrating feature information of an object according to an embodiment.

FIG. 5 shows a diagram illustrating feature information of an object according to an embodiment.

Referring to FIG. 5, the processor 130 according to one embodiment may obtain the image 11 corresponding to the first region of interest 21 in the image 10 obtained by the camera 110. The processor 130 may then apply the image 11 corresponding to the first region of interest 21 to the second artificial intelligence model 2 to obtain the information 11-1 on the first object region.

The processor 130 according to an embodiment may obtain the feature information of the first object by inputting the information 11-1 on the first object region to the third artificial intelligence model 3.

For example, if the first object is the first user, the processor 130 may obtain the face recognition information, face identification information, or the like, of the first user by inputting the information on the first object region to the third artificial intelligence model 3.

The processor 130 according to an embodiment may obtain the image corresponding to the object region from the image corresponding to the region of interest based on the information on the object region or the image 20 obtained by the camera 110.

For example, the information about the object region obtained from the second artificial intelligence model may include information about one or more of the location, size, pixel value, etc. of the object. The processor 130 may obtain only the image corresponding to the object region in an image of high resolution (e.g., the image 20 obtained by the camera 110) based on information about the object region.

Referring to FIG. 5, a case in which the third artificial intelligence model 3 obtains the face recognition information of the first object as the feature information of the first object is described with reference to FIG. 5, but the embodiment is not limited thereto. The electronic apparatus 100 according to an embodiment may include a plurality of artificial intelligence models, and each of the plurality of artificial intelligence models can be a model trained to obtain the feature of different objects.

Figure 6:
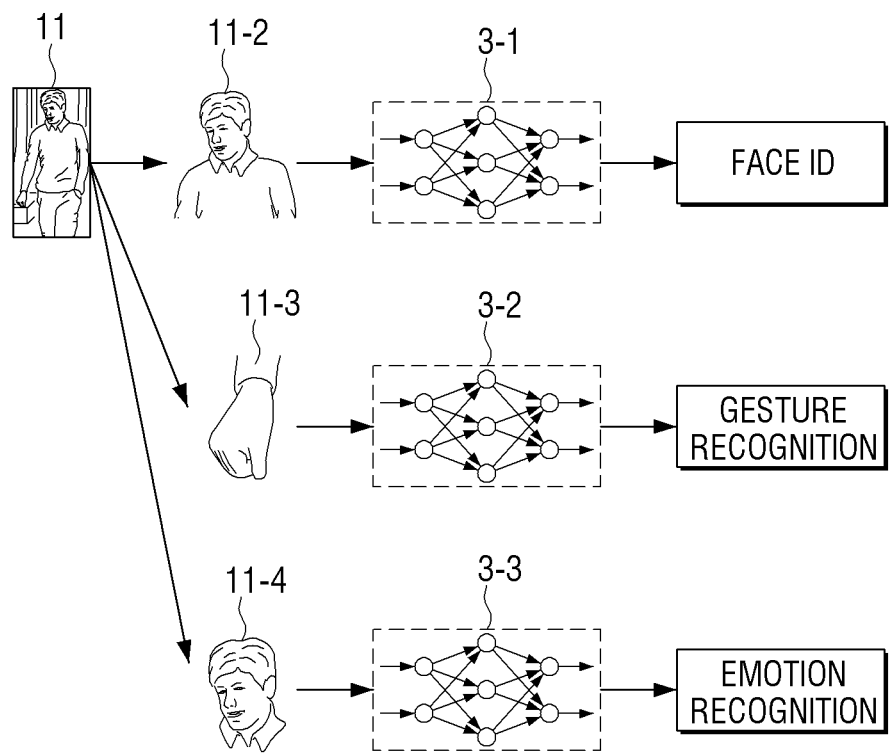
FIG. 6 shows a diagram illustrating an artificial intelligence models according to an embodiment.

A specific description will refer to FIG. 6.

FIG. 6 shows a diagram illustrating an artificial intelligence models according to an embodiment.

Referring to FIG. 6, the third artificial intelligence model 3 according to an embodiment may include a plurality of artificial intelligence models 3-1, 3-2, 3-3 trained to obtain different feature information of an object.

Referring to FIG. 6, information on the first object region obtained from the second artificial intelligence model 2 may include information on each of a plurality of sub-regions constituting the first object. For example, if the first object is the first user, the information 11-1 for the first object region may include location information, size information, etc., for each of a plurality of sub-regions (e.g., a face region, an upper body region, a lower body region, etc.) that constitute the shape of the first user.

The processor 130 according to one embodiment may input each of the plurality of sub-regions to different artificial intelligence models. For example, the processor 130 may input different images to each of the plurality of artificial intelligence models 3-1, 3-2, and 3-3 based on information about the object region output by the second artificial intelligence model 2.

For example, the processor 130 may input an image corresponding to the upper body region of the first object to the first artificial intelligence model 3-1 among the plurality of artificial intelligence models 3-1, 3-2, and 3-3 based on information on the first object region. The processor 130 may then obtain face recognition information from the first artificial intelligence model 3-1. According to an embodiment, the first artificial intelligence model 3-1 can be a model trained to obtain face recognition information and face identification information using a plurality of sample images (e.g., images including upper body region of a human).

As another example, the processor 130 may input an image corresponding to the hand region of the first object to the second artificial intelligence model 3-2 among the plurality of artificial intelligence models 3-1, 3-2, and 3-3 based on information on the first object region. The processor 130 may then obtain the first user's gesture recognition information or fingerprint recognition information from the second artificial intelligence model 3-2. The second artificial intelligence model 3-2 according to an embodiment can be a model trained to obtain gesture recognition information or fingerprint recognition information using a plurality of sample images (e.g., images including human hand regions).

As another example, the processor 130 may input an image corresponding to the face region of the first object to the third artificial intelligence model 3-3 among the plurality of artificial intelligence models 3-1, 3-2, and 3-3 based on information on the first object region. The processor 130 may then obtain the first user's emotion information from the third artificial intelligence model 3-3. The third artificial intelligence model 3-3 according to one embodiment may be a model trained to obtain emotion information using a plurality of sample images (e.g., images that include human face regions). The input images and output information for the plurality of artificial intelligence models 3-1, 3-2, and 3-3 are examples and are not limited thereto. For example, each of the plurality of artificial intelligence models 3-1, 3-2, and 3-3 may be a model trained to obtain and output different feature information of the object.

Figure 7:
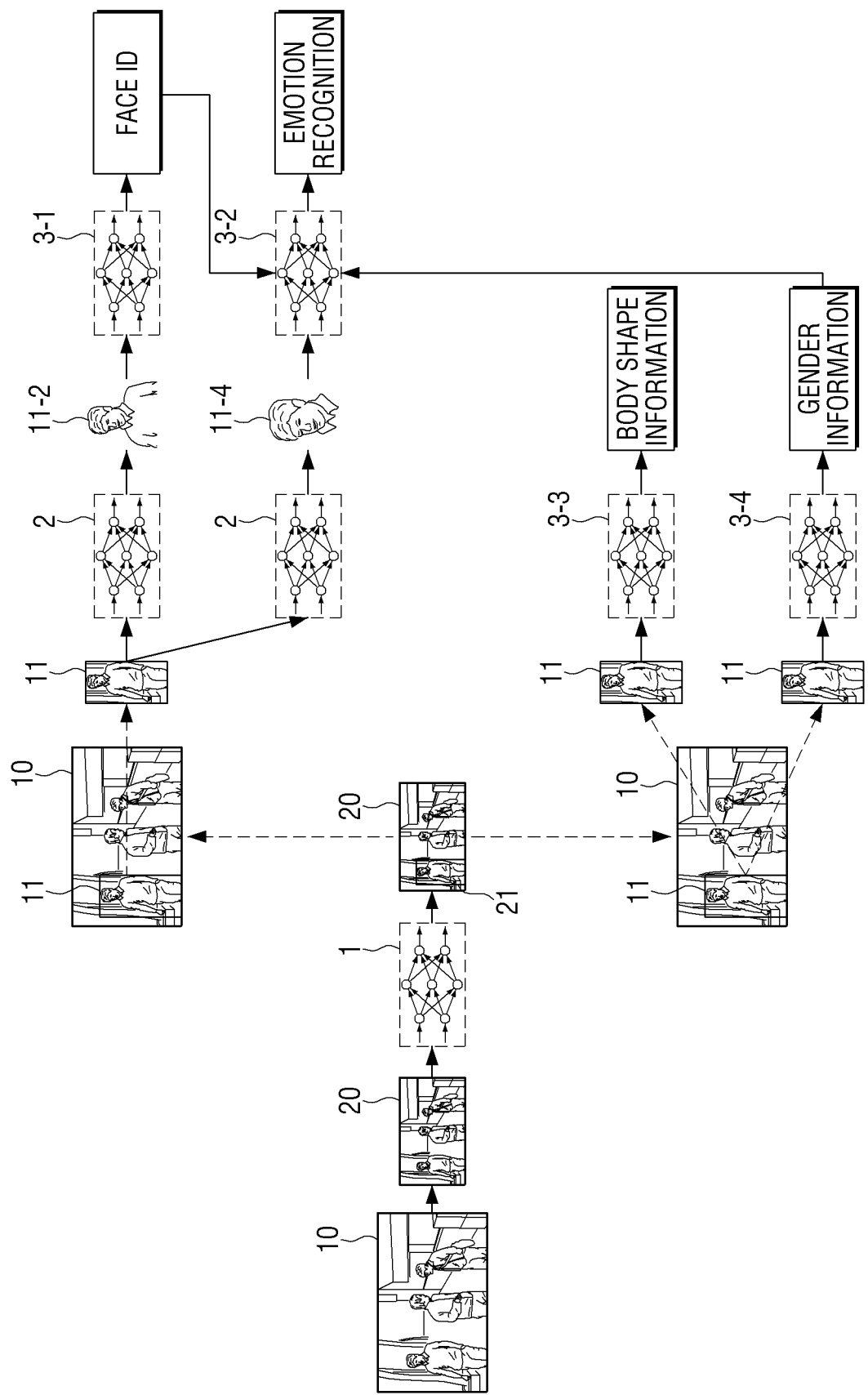
FIG. 7 shows a diagram illustrating a plurality of feature information according to an embodiment.

FIG. 7 shows a diagram illustrating a plurality of feature information according to an embodiment.

Referring to FIG. 7, the processor 130 according to an embodiment may input the downscaled image 20 to the first artificial intelligence model 1 to obtain information on the first region of interest 21.

The processor 130 may obtain the image 11 corresponding to the first region of interest 21 from the image 10 obtained by the camera 110 based on the information about the first region of interest 21. The processor 130 may input the image 11 corresponding to the first region of interest 21 to the second artificial intelligence model 2 or the third artificial intelligence model 3.

According to an embodiment, the processor 130 may input the image 11 corresponding to the first region of interest to the second artificial intelligence model 2 to obtain information about the first object region. For example, if the first object included in the image 11 corresponding to the first region of interest is the first user, the information 11-1 for the first object region may include location information, size information, etc. for each of a plurality of sub-regions (e.g., a face region, an upper body region, a lower body region, etc.) that constitute the shape of the first user.

The processor 130 according to an embodiment may input different images to each of a plurality of artificial intelligence models based on the information 11-1 for the first object region. For example, the processor 130 may input an image of the upper body region to the first artificial intelligence model 3-1 among the plurality of artificial intelligence models based on the information 11-1 for the first object region to obtain the face recognition information of the first user. According to an embodiment, the face recognition information may refer to information used in one or more of: security, passwords or passcodes, or the like.

According to another embodiment, the processor 130 may input an image of the face region to the second artificial intelligence model 3-2 among the plurality of artificial intelligence models based on the information 11-1 for the first object region to obtain emotion recognition information of the first user. The face recognition information, emotion recognition information, or the like, are only one example of various feature information of the first object, and are not limited thereto.

As another example, the processor 130 according to an embodiment may input the image 11 corresponding to a first region of interest to each of a plurality of artificial intelligence models to obtain feature information of a first object corresponding to the first region of interest 21. For example, the processor 130 may input the image 11 corresponding to the first region of interest to the third artificial intelligence model 3-3 among the plurality of artificial intelligence models to obtain the first user's body type information. As another example, the processor 130 may input the image 11 corresponding to the first region of interest to the fourth artificial intelligence model 3-4 among the plurality of artificial intelligence models to obtain the gender information of the first user. The body type information of the first user and the gender information of the first user are only one example of various feature information of the first object that can be obtained by inputting the first object included in the image 110 corresponding to the first region of interest to the artificial intelligence model.

As described above, the third artificial intelligence model 3 included in the electronic apparatus 100 according to an embodiment may include the plurality of artificial intelligence models 3-1, 3-2, . . . 3-n trained to obtain different feature information of the object.

The processor 130 according to one embodiment may input the first feature information obtained from any one of the plurality of artificial intelligence models 3-1, 3-2, 3-n to another one of the plurality of artificial intelligence models 3-1, 3-2, . . . , 3-n to obtain second feature information of the object. According to an embodiment, each of the plurality of artificial intelligence models can be a model trained to obtain other feature information of an object based on an image corresponding to the object region and one feature information of the object.

For example, the processor 130 may input the face recognition information of the first object obtained from the first artificial intelligence model 3-1 among the plurality of artificial intelligence models 3-1, 3-2, . . . , 3-n and the gender information of the first object obtained from the third artificial intelligence model 3-4 to the second artificial intelligence model 3-2 among the plurality of artificial intelligence models 3-1, 3-2, . . . , 3-n.

In other words, the processor 130 may input the image of the face region, the face recognition information, and the gender recognition information to the second artificial intelligence model 3-2 among the plurality of artificial intelligence models to obtain emotion recognition information of the first user. According to an embodiment, the processor 130 may obtain the other feature information of the object by inputting the image of the object and the feature information of the object obtained from the artificial intelligence model, along with the one artificial intelligence model in order to obtain the feature information of the object with a relatively high reliability and accuracy.

The memory 120 according to an embodiment may include the fourth artificial intelligence model trained to identify the object from the input image.

According to one embodiment, the first artificial intelligence model 1 can identify a region of interest included in the downscaled image 20 and output probability information indicating a probability of whether an object is included in the region of interest. For example, the first artificial intelligence model 1 may identify a region of interest that is assumed to include an object in the downscaled image 20, and output probability information indicating whether an object is included in the region of interest (or the degree of guess) as a probability. For example, the first artificial intelligence model 1 may display whether the first user is included in the first region of interest 21 (or the degree of guess) as a value of 0 to 1. Here, the probability information (or probability value) 1 may denote that it is guessed or assumed with 100% probability that the first user is included in the first region of interest 21.

When the probability information is less than the critical value, the processor 130 according to an embodiment may input the image corresponding to the region of interest to the fourth artificial intelligence model.

For example, the probability information that the first object is estimated to be included in the first object in the first region of interest 21 is less than the critical value 0.5 based on the information on the first region of interest 21, the processor 130 may input the image 11 corresponding to the first region of interest 21 to the fourth artificial intelligence model 4 prior to inputting the image 11 to the second artificial intelligence model 2 or the third artificial intelligence model 3. If the processor 130 identifies that an object is included in the image 11 corresponding to the region of interest 21 based on the output of the fourth artificial intelligence model 4, the processor 130 may input the image 11 corresponding to the region of interest 21 to the second artificial intelligence model 2 or the third artificial intelligence model 3.

The processor 130 may obtain an image corresponding to the region of interest from the image prior to the downscaling (the original image), if it is not clear whether the object is included in the region of interest obtained based on the downscaled image 20, and identify whether the object is included based on the image corresponding to the obtained region of interest. According to an embodiment, only based on identifying that the object is included in the image corresponding to the region of interest, the image may be input to the second artificial intelligence model 2 or the third artificial intelligence model 3. Even if an object is not actually included in an image corresponding to the region of interest, the corresponding image may be input to the second artificial intelligence model 2 or the third artificial intelligence model 3 to prevent unnecessary calculations from being performed.

Figure 8:
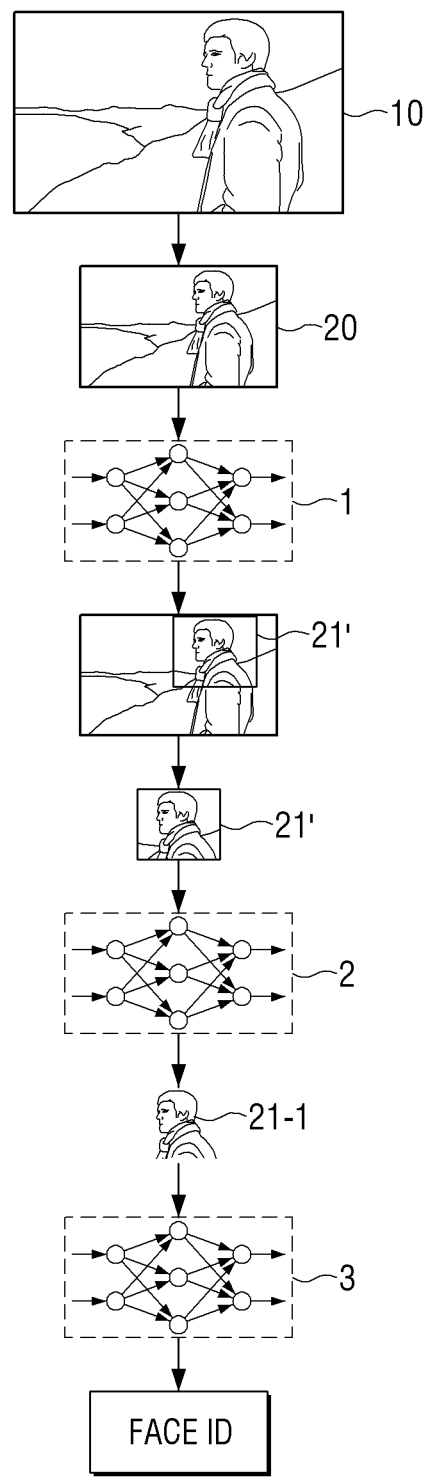
FIG. 8 shows a diagram illustrating a downscaled image according to another embodiment.

FIG. 8 shows a diagram illustrating a downscaled image according to another embodiment.

Referring to FIG. 8, based on identifying that the size of the region of interest is greater than or equal to a threshold value based on information about the region of interest, the processor 130 may obtain an image corresponding to the region of interest in the downscaled image 20 and enter the obtained image into the second artificial intelligence model 2, according to an embodiment.

For example, the processor 130 may enter the downscaled image 20 into the first artificial intelligence model 1 to obtain information about the first region of interest 21. Based on the processor 130 identifying that the size of the first region of interest is greater than or equal to a threshold value (e.g., a horizontal and vertical pixel value greater than or equal to a predetermined size) based on information about the first region of interest 21, the processor 130 may not obtain an image corresponding to the first region of interest 21 in the original image 10, but may obtain an image 21' corresponding to the first region of interest 21 in the downscaled image 20. The processor 130 may then apply the image 21' corresponding to the first region of interest 21 to the second artificial intelligence model 2 to obtain the information 21-1 on the first object region.

The processor 130 may obtain the feature information (for example, face recognition information) of the first object by inputting the image corresponding to the first object to the third artificial intelligence model 3 based on the information 21-1 of the first object region.

Figure 9:
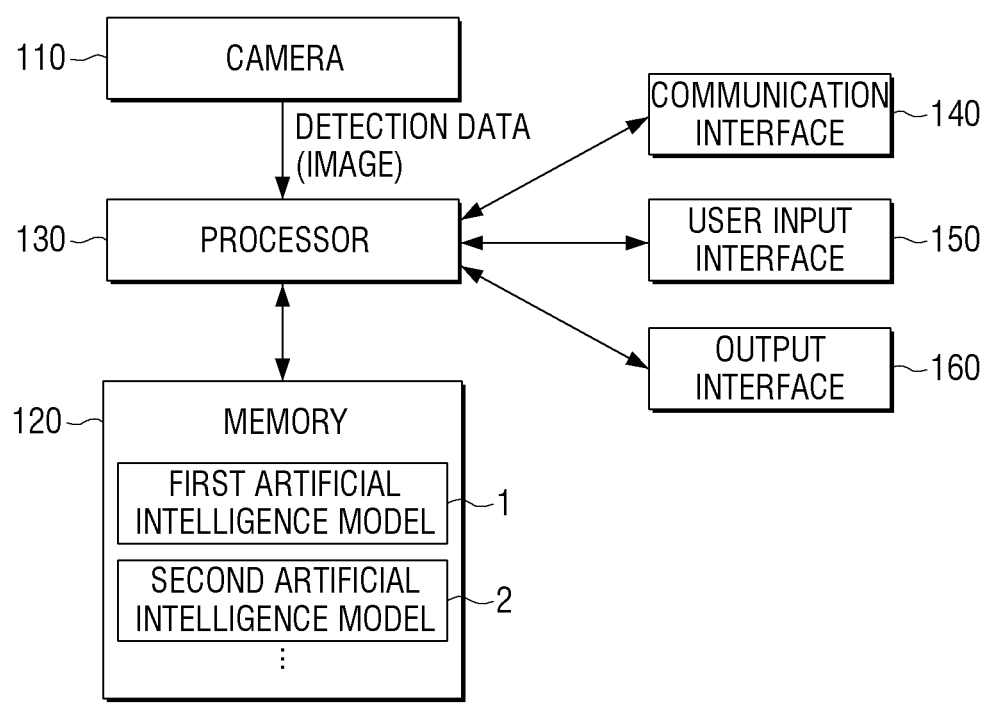
FIG. 9 shows a block diagram illustrating a specific configuration of an electronic apparatus according to an embodiment.

FIG. 9 shows a block diagram illustrating a specific configuration of an electronic apparatus according to an embodiment.

The electronic apparatus 100 according to an embodiment may include the camera 110, the memory 120, the processor 130, the communication interface 140, the user input interface 150, and the output interface 160.

The camera 110 may be implemented as an RGB camera, 3D camera, or the like. The 3D camera may be implemented as a time of flight (TOF) camera including a sensor and an infrared light. The 3D camera may include an infrared (IR) stereo sensor. The camera 110 may include, but is not limited thereto, a sensor such as a charge-coupled device (CCD), complementary metal-oxide semiconductor (CMOS), or the like. When the camera 110 includes the CCD, the CCD may be implemented as RGB, CCD, IR CCD, or the like.

The memory 120 may store the first artificial intelligence model 1 trained to identify a region of interest in the input image, the second artificial intelligence model 2 trained to identify an object region in the input image, the third artificial intelligence model 3 including a plurality of artificial intelligence models trained to obtain different feature information of the object, and the fourth artificial intelligence model trained to identify the object in the input image.

The memory 120 may include read-only memory (ROM), random access memory (RAM) (e.g., dynamic RAM (DRAM), synchronous DRAM (SDRAM), double data rate SDRAM (SDRAM)), or the like, and may be implemented in a single chip along with the processor 130.

The functionality associated with artificial intelligence according to the disclosure operates via the processor 130 and the memory 120. The processor 130 may be configured with one or a plurality of processors. The one or more processors may include, for example, a general purpose processor, such as, for example, and without limitation, a central processing unit (CPU), an application processor (AP), a digital signal processor (DSP), or the like, a graphics-only processor such as a graphics processing unit (GPU), a vision processing unit (VPU), an artificial intelligence-only processor such as a neural processing unit (NPU), or the like. The one or more processors control the processing of the input data in accordance with a predefined operating rule or AI model stored in memory 120. Alternatively, if one or a plurality of processors is an AI-only processor, the AI-only processor may be designed with a hardware structure specialized for the processing of a particular AI model.

The pre-defined operating rule or AI model may be made through learning. Here, being made through learning may refer to a predetermined operating rule or AI model set to perform a desired feature (or purpose) is made by applying learning algorithm to various training data. The learning may be implemented in an electronic apparatus in which artificial intelligence is performed or may be accomplished through a separate server and/or system. Examples of learning algorithms include supervised learning, unsupervised learning, semi-supervised learning, or reinforcement learning, and the learning algorithm in the disclosure is not limited to the examples described above except when specified.

The AI model may be composed of a plurality of neural network layers. Each layer has a plurality of weight values, and performs a layer operation through calculation of a previous layer and an operation of a plurality of weights. A plurality of weights of a plurality of neural network layers may be optimized and/or improved by a learning result of the A model. For example, a plurality of weights may be updated such that a loss value or cost value obtained in the AI model during the learning process is reduced or minimized. The artificial neural network may include, for example, and without limitation, a deep neural network (DNN), a convolutional neural network (CNN), a recurrent neural network (RNN), a Restricted Boltzmann Machine (RNN), a Deep Belief Network (DBN), a Bidirectional Recurrent Deep Neural Network (BRDNN), deep Q-Networks, or the like.

The communication interface 140 may be configured to perform communication by the first electronic apparatus 100 with at least one external device to transceive signal/data. For this purpose, the communication interface 140 may include hardware circuitry.

The communication interface 140 may include software, such as, a wireless communication module, a wired communication module, or the like.

The wireless communication module may include at least one of a Wi-Fi (wireless fidelity) communication module, a Direct Wi-Fi communication module, a Bluetooth module, an Infrared Data Association (IrDA) module, a third generation (3G) mobile communication module, a fourth generation (4G) mobile communication module, a fourth generation Long Term Evolution (LTE) communication module, for receiving content from an external server or an external device.

The wired communication module may be implemented as a wired port such as a Thunderbolt port, a universal serial bus (USB) port, or the like.

The user input interface 150 may include one or more of: one or more buttons (e.g., a hard key or a soft key), or one or more peripheral devices, such as, a keyboard, a mouse, or the like. The user input interface 150 may also include a touch panel or a separate touch pad implemented with a display.

The user input interface 150 may include a microphone to receive a user command or input data as a speech (e.g., a speech command) or may include a camera 120 for receiving the user command or input data as an image or a motion.

The output interface 160 may be configured to provide various information obtained by the electronic apparatus 100 to a user.

For example, the output interface 160 may include one or more of a display, a speaker, an audio terminal, or the like, to provide information (e.g., the obtained feature information) visually and/or audibly to a user.

A driving controller may be configured to control a moving means of the electronic apparatus 100 and may include an actuator that provides power to the moving means of the electronic apparatus. The processor 130 may control the moving means of the electronic apparatus 100 through the driving controller to move the electronic apparatus 100.

Figure 10:
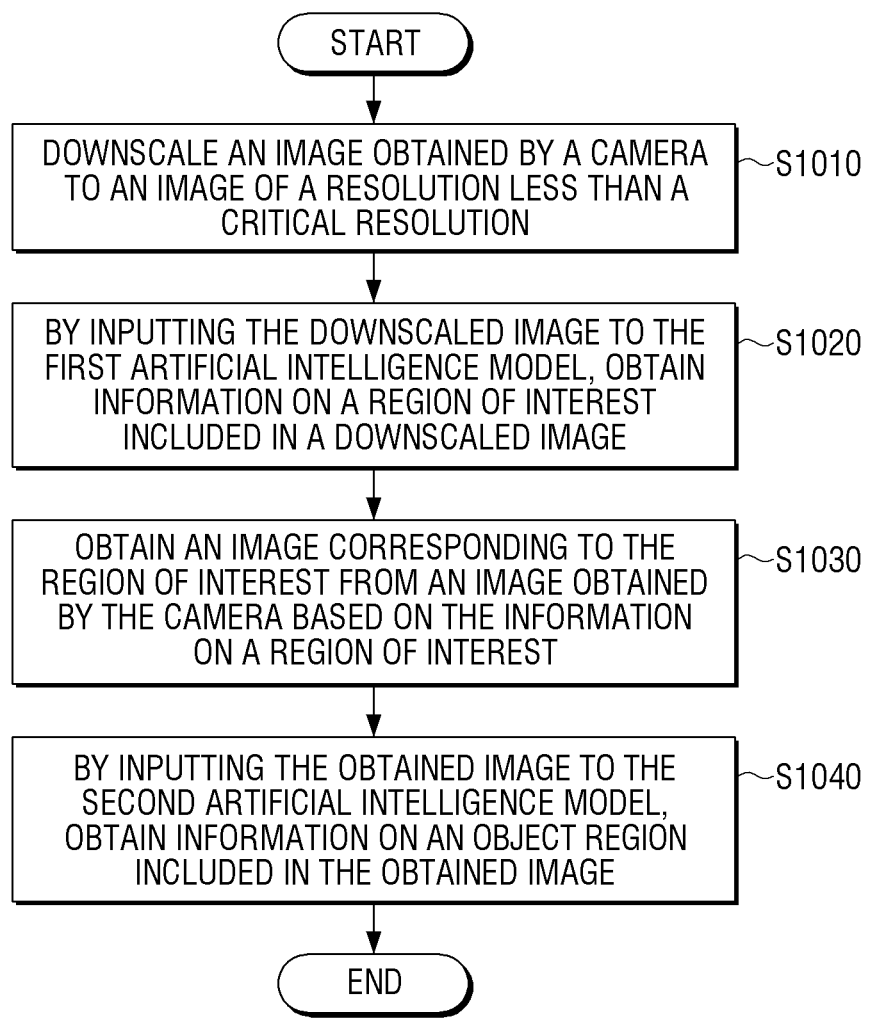
FIG. 10 shows a flowchart illustrating a method of controlling an electronic apparatus according to an embodiment.

FIG. 10 shows a flowchart illustrating a method of controlling an electronic apparatus according to an embodiment.

A method for controlling an electronic apparatus according to an embodiment may include downscaling an image obtained by a camera to an image of a resolution less than a critical resolution in operation S1010.

By inputting the downscaled image to the first artificial intelligence model, information on a region of interest included in a downscaled image may be obtained in operation S1020.

An image corresponding to the region of interest may be obtained from an image obtained by the camera based on the information on a region of interest in operation S1030.

By inputting the obtained image to the second artificial intelligence model, information on an object region included in the obtained image may be obtained in operation S1040.

The first artificial intelligence model is a model trained using a sample image less than a critical resolution and the second artificial intelligence model may be a model trained by using a sample image greater than or equal to a critical resolution.

In step S1040 of obtaining information on an object region according to an embodiment, a step of resizing an image corresponding to the obtained region of interest into an image of a critical size and a step of inputting the resized image of the critical size to the second artificial intelligence model to obtain information on the object region may be included.

According to an embodiment, the electronic apparatus may further include storing a third artificial intelligence model trained to obtain feature information of an object based on an object region included in an input image, and the controlling method according to an embodiment may further include obtaining an image corresponding to an object region in an image obtained by an image or a camera corresponding to the region of interest based on information on the object region, and inputting the obtained image to a third artificial intelligence model to obtain feature information of an object included in the obtained image.

The third artificial intelligence model may include a plurality of artificial intelligence models trained to obtain different feature information of the object, and the obtaining feature information of the object may include the step of obtaining the second feature information of the object by inputting the first feature information obtained from any one of the artificial intelligence models to the other one of the artificial intelligence models. Here, the plurality of artificial intelligence models may be a model trained to obtain other feature information of an object based on an image corresponding to the object region and one feature information of the object.

The information on the object may be information on a user area adjacent to the electronic apparatus in the image obtained by the camera, and the obtaining the feature information of the object can include inputting an image corresponding to the user area to a third artificial intelligence model to obtain the feature information of the user. The feature information of the user may include at least one of face recognition information, gender information, body type information, or emotion recognition information of a user.

The electronic apparatus according to an embodiment includes the fourth artificial intelligence model trained to identify an object from an input image, and a controlling method according to an embodiment may include the steps of inputting an image corresponding to a region of interest to a fourth artificial intelligence model, based on the probability information of the region of interest included in the information for the region of interest being less than a threshold; identifying whether an object is included in an image corresponding to the region of interest based on the output of the fourth artificial intelligence model; and inputting the image corresponding to the region of interest to the second artificial intelligence model if the object is included in the image corresponding to the region of interest.

The controlling method according to an embodiment may include the steps of obtaining an image corresponding to a region of interest in a downscaled image, if a size of the region of interest is identified as being greater than or equal to a threshold based on information on the region of interest; and inputting the obtained image to a second artificial intelligence model.

The region of interest according to an embodiment may include at least one of a region including an object, a region where a motion occurs, a color changing region, or an illuminance change region.

The electronic apparatus according to an embodiment may be a mobile robot moving in a specific space.

Figure 11:
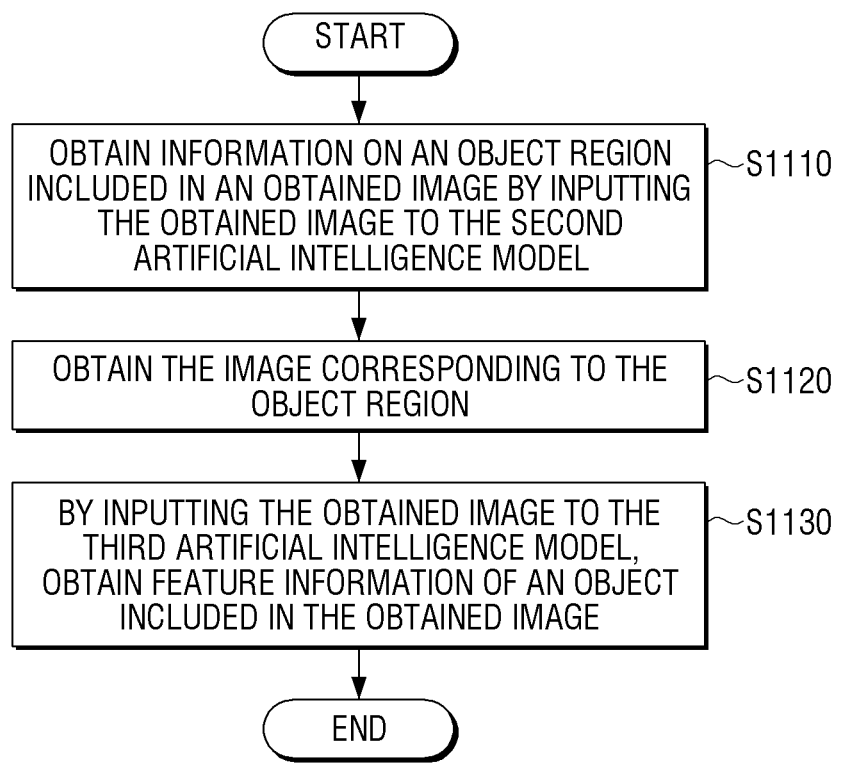
FIG. 11 shows a flowchart illustrating an operation of obtaining feature information of an object according to an embodiment.

FIG. 11 shows a flowchart illustrating an operation of obtaining feature information of an object according to an embodiment.

Referring to FIG. 11, the controlling method according to an embodiment may include obtaining information on an object region included in an image by inputting the image to the second artificial intelligence model in operation S1110.

The image corresponding to the object region is obtained in operation S1120.

By inputting the obtained image to the third artificial intelligence model, feature information of an object included in the obtained image is obtained in operation S1130.

The various example embodiments described above may be implemented in a recordable medium which is readable by computer or a device similar to computer using software, hardware, or the combination of software and hardware. In some cases, embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations of the electronic apparatus 100 according to the various embodiments described above may be stored in a non-transitory computer-readable medium. The computer instructions stored in this non-transitory computer-readable medium may cause the above-described specific device to perform the processing operations in the electronic apparatus 100 according to the above-described various example embodiments when executed by the processor of a specific device.

The non-transitory computer readable medium may refer, for example, to a medium that stores data semi-permanently, and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like.

The foregoing example embodiments and advantages are merely examples and are not to be understood as limiting the disclosure. The present disclosure may be readily applied to other types of devices. The description of the embodiments of the disclosure is intended to be illustrative, and not to limit the scope of the claims, and many alternatives, modifications, and variations will be apparent to those skilled in the art.

What is claimed is:

1. An electronic apparatus comprising:
a processor configured to:
obtain an image captured by a camera;
obtain a downscaled image by downscaling the captured image, wherein the downscaled image is an image that is less than a critical resolution;
identify a region of interest included in the downscaled image by inputting the downscaled image comprising a preceding image and a subsequent image in a time order into a first artificial intelligence model, the first artificial intelligence model being trained to identify a region of interest in an input image by comparing a preceding image comprised in the input image with a subsequent image comprised in the input image;
extract, from the captured image greater than or equal to the critical resolution, an object image in the captured image corresponding to the identified region of interest, wherein the object image is an image that is greater than or equal to a critical size; and
obtain information on an object region included in the captured image by inputting the extracted object image into a second artificial intelligence model, the second artificial intelligence model being configured to identify an object region in an input image.

2. The electronic apparatus of claim 1, further comprising:
a memory that stores the first artificial intelligence model and the second artificial intelligence model.

3. The electronic apparatus of claim 2, wherein the memory further stores a third artificial intelligence model trained to obtain feature information of an object based on an object region included in an input image, and
the processor is further configured to:
obtain the feature information of an object included in the object region by inputting the extracted object image to the third artificial intelligence model.

4. The electronic apparatus of claim 3, wherein the third artificial intelligence model comprises a plurality of artificial intelligence models trained to obtain different feature information of the object,
the processor is further configured to obtain second feature information of the object by inputting first feature information obtained from a first model of the plurality of artificial intelligence models to a second model of the plurality of artificial intelligence models, the first model being different from the second model, and the plurality of artificial intelligence models are each trained to obtain other feature information of the object based on an object region included in an input image.

5. The electronic apparatus of claim 3, wherein the information on the object is information about a user area adjacent to the electronic apparatus in the captured image,
the processor is further configured to obtain feature information of a user by inputting the extracted object image corresponding to the user area to the third artificial intelligence model, and
the feature information of the user comprises at least one of facial recognition information, gender information, body shape information, or emotion recognition information of the user.

6. The electronic apparatus of claim 2, wherein the memory further stores a fourth artificial intelligence model trained to identify an object in an input image, and
the processor is further configured to:
identify whether an object is included in the object region by inputting the extracted object image into the fourth artificial intelligence model, and
based on the object being included in the object region, input the extracted object image to the second artificial intelligence model.

7. The electronic apparatus of claim 1, wherein the first artificial intelligence model is a model trained using a sample image less than the critical resolution, and
the second artificial intelligence model is a model trained using a sample image greater than or equal to the critical resolution.

8. The electronic apparatus of claim 1, wherein the processor is further configured to:
resize the object image to be the critical size, and
obtain the information on the object region by inputting the resized object image of the critical size to the second artificial intelligence model.

9. The electronic apparatus of claim 1, wherein the region of interest comprises at least one of: a region including an object, a region where a motion occurs, a color change region, or an illuminance change region.

10. The electronic apparatus of claim 1, wherein the electronic apparatus is a mobile robot, and the processor is further configured to control the mobile robot to move.

11. The electronic apparatus of claim 1, wherein the processor is further configured to:
detect an intruder or a fire generation region based on the object image, and
based on detecting the intruder or the fire generation region, perform a corrective action, wherein the corrective action includes at least one of: outputting an alarm audibly via a speaker or visually via a display, controlling a display to display the object image and/or the region of interest, or transmitting the information on the object to a user terminal.

12. The electronic apparatus of claim 1, further comprising the camera.

13. A method comprising:
obtaining an image captured by a camera;
obtaining a downscaled image by downscaling the captured image, wherein the downscaled image is an image that is less than a critical resolution;
identifying a region of interest included in the downscaled image by inputting the downscaled image comprising a preceding image and a subsequent image in a time order into a first artificial intelligence model, the first artificial intelligence model being trained to identify a region of interest in an input image by comparing a preceding image comprised in the input image with a subsequent image comprised in the input image;
extracting, from the captured image greater than or equal to the critical resolution, an object image in the captured image corresponding to the identified region of interest, wherein the object image is an image that is greater than or equal to a critical size; and
obtaining information on an object region included in the captured image by inputting the extracted object image into a second artificial intelligence model, the second artificial intelligence model being configured to identify an object region in an input image.

14. The method of claim 13, wherein the first artificial intelligence model is a model trained using a sample image less than the critical resolution, and the second artificial intelligence model is a model trained using a sample image greater than or equal to the critical resolution.

15. The method of claim 13, wherein the obtaining information on the object region comprises:
resizing the object image to be the critical size, and
obtaining the information on the object region by inputting the resized object image of the critical size to the second artificial intelligence model.

16. The method of claim 13, the method further comprises:
obtaining feature information of an object included in the object region by inputting the extracted object image to a third artificial intelligence model, and
wherein the third artificial intelligence model is a model trained to obtain feature information of an object based on an object region included in an input image.

17. The method of claim 16, wherein the third artificial intelligence model comprises a plurality of artificial intelligence models trained to obtain different feature information of the object,
wherein the obtaining the feature information comprises obtaining second feature information of the object by inputting first feature information obtained from a first model of the plurality of artificial intelligence models to a second model of the plurality of artificial intelligence models, the first model being different from the second model, and
wherein the plurality of artificial intelligence models are each trained to obtain other feature information of the object based on an object region included in an input image.

18. The method of claim 16, wherein the information on the object is information about a user area adjacent to an electronic apparatus in the captured image,
wherein the obtaining the feature information comprises obtaining feature information of a user by inputting the extracted object image corresponding to the user area to the third artificial intelligence model, and
wherein the feature information of the user comprises at least one of facial recognition information, gender information, body shape information, or emotion recognition information of the user.

19. The method of claim 13, the method further comprises:
identifying whether an object is included in the object region by inputting the extracted object image into the fourth artificial intelligence model, and
based on the object being included in the object region, inputting the extracted object image to the second artificial intelligence model, wherein the fourth artificial intelligence model is a model trained to identify an object in an input image.

* * * * *